United States Patent [19]
Harpin

[11] Patent Number: 5,514,038
[45] Date of Patent: May 7, 1996

[54] FLEXIBLE COUPLING FACILITATING BLIND ASSEMBLY

[75] Inventor: Graham E. Harpin, Halifax, England

[73] Assignee: Holset Engineering Company, Ltd., Turnbridge, England

[21] Appl. No.: 110,238

[22] Filed: Aug. 23, 1993

[51] Int. Cl.$^6$ .................................................. F16D 3/52
[52] U.S. Cl. ....................................... 464/93; 464/71
[58] Field of Search ......................... 464/71, 93, 92, 464/89, 90

[56] References Cited

U.S. PATENT DOCUMENTS

| 4,385,893 | 5/1983 | Kirschey | 464/89 |
| 4,715,780 | 12/1987 | Kan | 464/93 |
| 5,195,625 | 3/1993 | Chang et al. | 464/89 |

FOREIGN PATENT DOCUMENTS

| 106579 | 4/1984 | European Pat. Off. | |
| 3384919 | 4/1990 | Germany | 464/89 |
| 3942797 | 7/1991 | Germany | 464/93 |
| 294104 | 1/1954 | Sweden | 464/93 |
| 1159750 | 7/1969 | United Kingdom | 464/93 |
| 2235034 | 2/1991 | United Kingdom | 464/93 |

Primary Examiner—Daniel P. Stodola
Assistant Examiner—Eileen A. Dunn

[57] ABSTRACT

A flexible coupling has an inner member and a resilient body mounted on the hub and connected thereto. A reinforcement ring is embedded within the resilient body. The ring has arcuately spaced tubes with tapered rubber liners. Fasteners for connecting the coupling to the flywheel are locatable within the rubber liners. The taper causes the fixing to induce a precompression in the rubber tubes when the coupling is assembled and fitted in place. The coupling minimizes backlash, provides extra torsional flexibility and permits blind assembly.

10 Claims, 3 Drawing Sheets

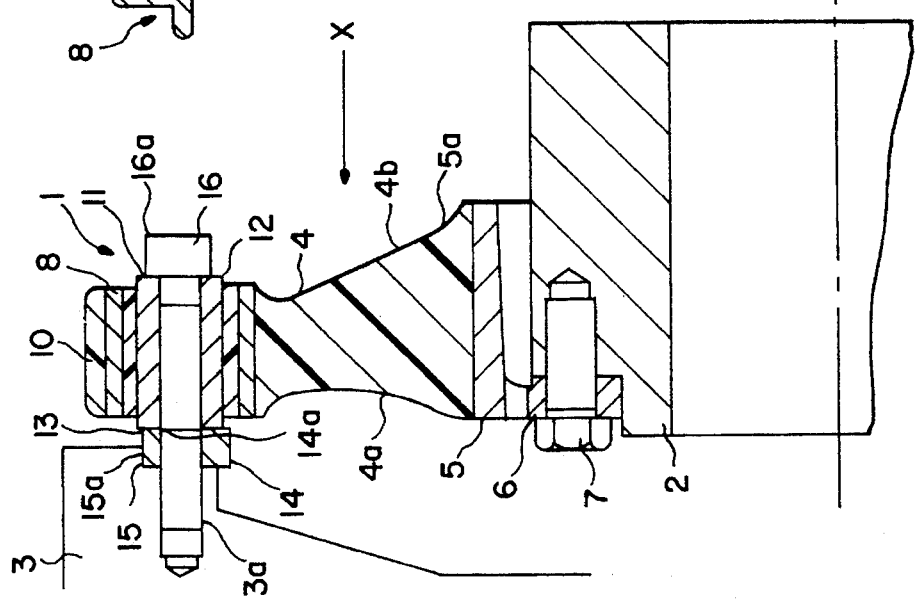

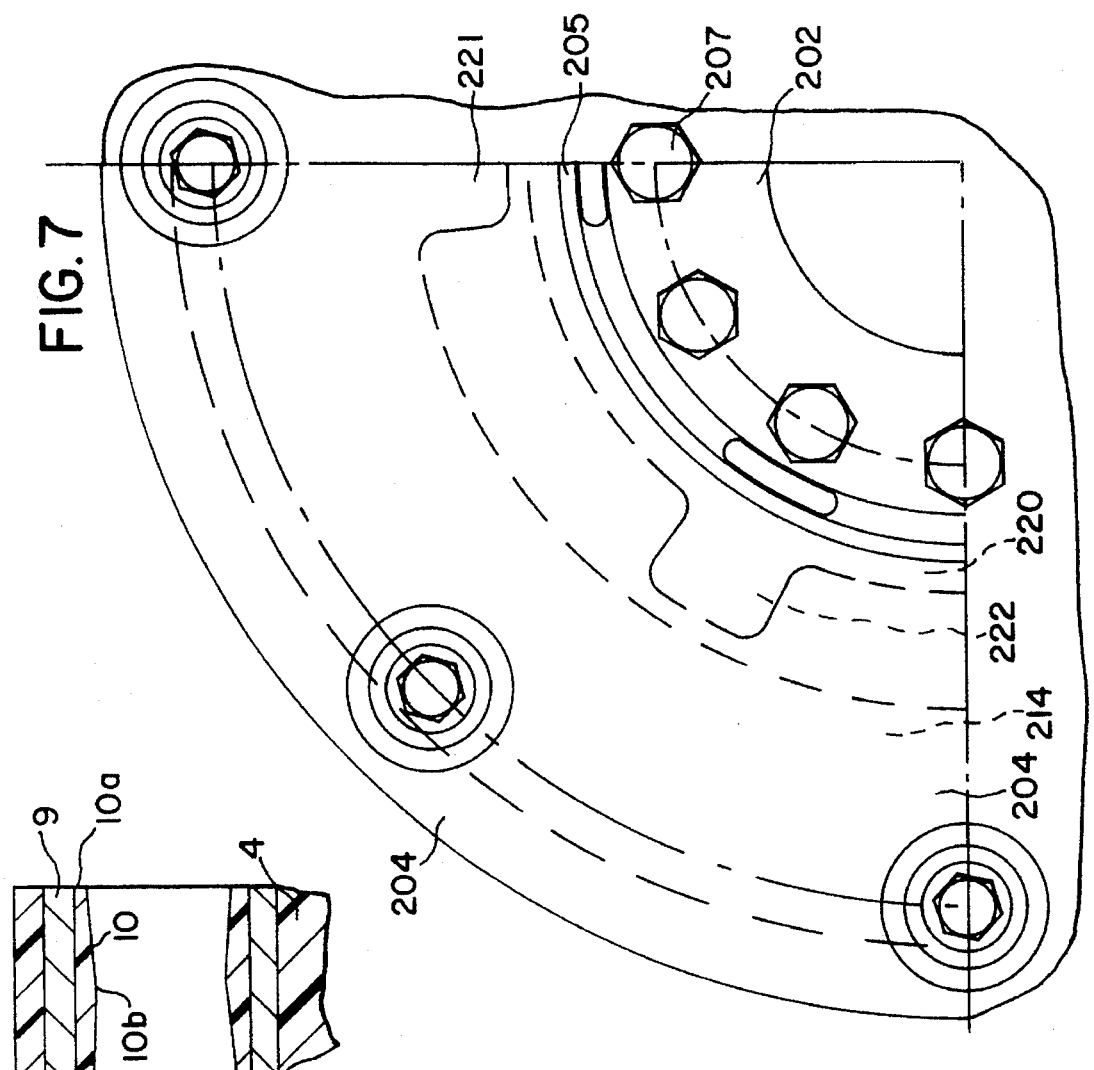

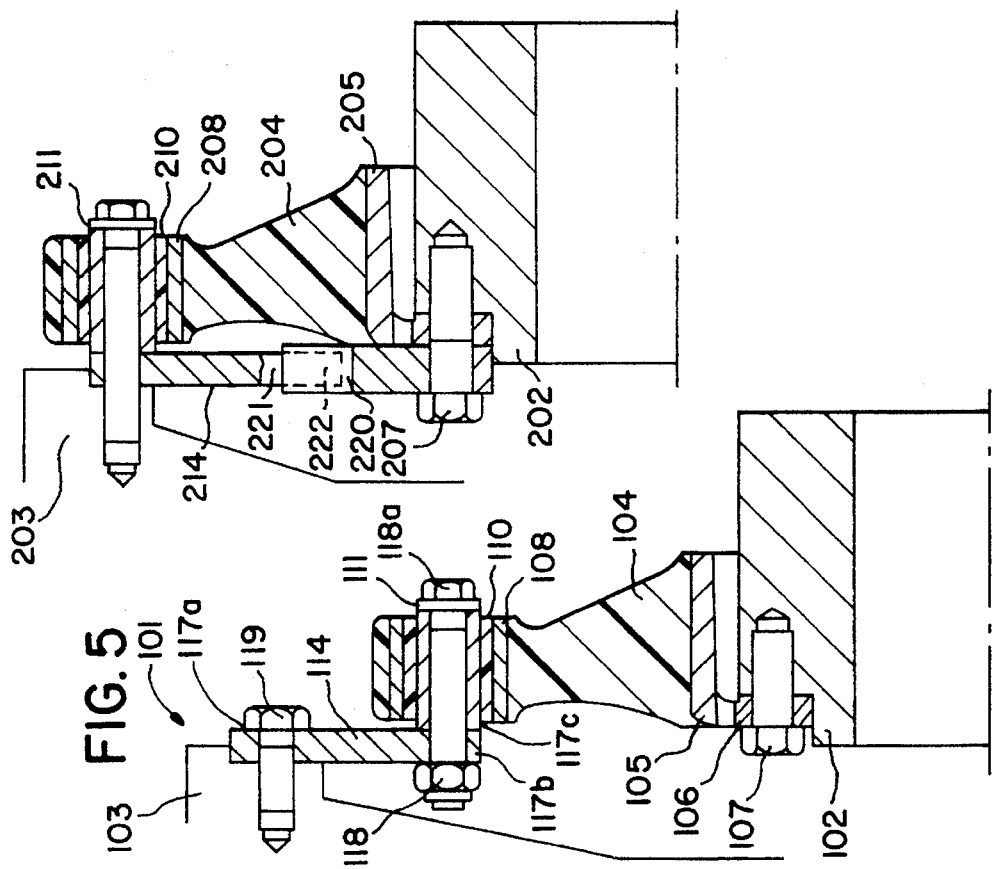
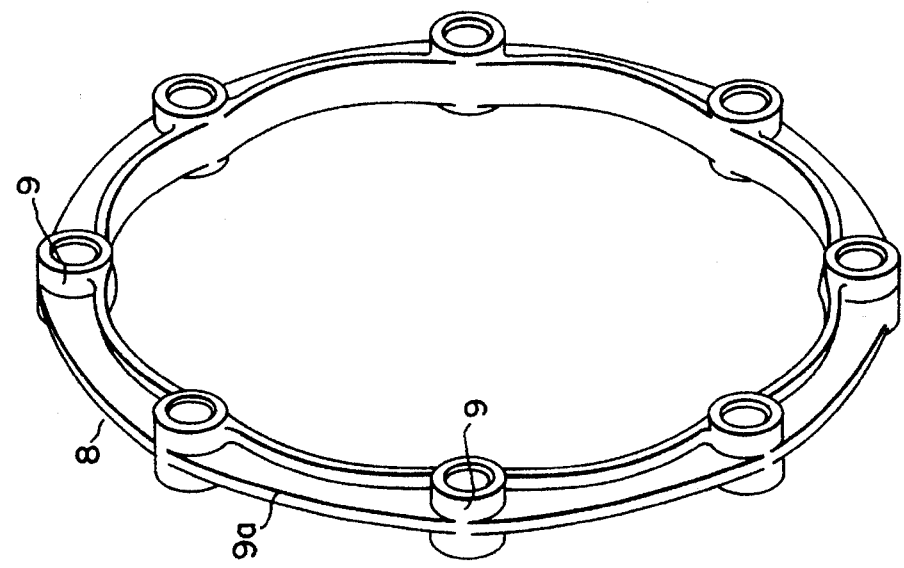

FLEXIBLE COUPLING FACILITATING BLIND ASSEMBLY

TECHNICAL FIELD

This invention relates to a flexible coupling and more particularly to a flexible coupling used to interconnect machine components.

BACKGROUND OF THE INVENTION

Known flexible couplings of this kind are often used to connect an engine flywheel to a driven component of the engine for example the gearbox or alternator. These couplings are substantially disc shaped having an inner metallic member connected to an outer metallic ring via a rubber body which is vulcanized to the inner member. The inner member of the coupling is connected to the driven component and the ring is bolted to the engine flywheel. The rubber body provides the torsional flexibility of the coupling.

In one particular known coupling the outer ring has a plurality of equiangularly spaced holes by means of which it is bolted to the flywheel. When the bolts are tightened, the face of the flywheel engages the ring. Resistance against backlash in this coupling is provided by the friction force between the flywheel face and the outer ring. This coupling is of limited flexibility because the rubber body is confined to the space between the inner member and the outer ring. Furthermore, blind assembly in this type of assembly, the flywheel carrying the ring and the driven component with the inner member are brought into engagement by feel without fitting or tightening any fixing elements which may be difficult to access as a result of housing structures in the engine, is not possible with this design as the bolts connecting the coupling to the flywheel need to be tightened.

In another known form of flexible coupling the rubber body has peripheral teeth which engage with corresponding teeth on the outer ring. The teeth on the outer ring and the rubber body allow the coupling to be assembled blind. This type of coupling has several disadvantages. Under load there is a tendency for adjacent engaging teeth to disengage, slip over each other and to re-engage with the next tooth. This causes undesirable wear on the teeth and ultimately can ruin the coupling. In transmitting torque the rubber teeth become compressed causing gaps to appear between the two sets of teeth. When the torque reverses, the presence of the gap causes backlash in the coupling. Furthermore, as a result of centrifugal forces generated during rotation of the coupling, the rubber teeth on the rubber body tend to swell during rotation and grip tightly the outer ring. This induces friction between them and effectively prevents axial movement between the rubber and the outer ring. Axial movement is desirable in flexible couplings to help provide compensation for any misalignment of the coupled components.

DISCLOSURE OF THE INVENTION

It is an object of the present invention to provide a flexible coupling with improved torsional flexibility and provides ease of assembly.

In accordance with the present invention there is provided a flexible coupling for interconnecting machine components comprising a rigid inner annular member for connection to one of the machine components, means for forming an outer annular member for connection to the other of the machine components, and a resilient annular body fixed to the inner and outer annular members, the outer annular means comprises a plurality of arcuately spaced rigid tubes extending generally axially through and embedded in the resilient annular body. A plurality of rigid pins are connected to the other of the machine elements and extend through said tubes. A resilient annular lining is fixed to the inner walls of each of the tubes such that at least a zero clearance exists between the pins and said tubes, whereby the coupling can be assembled by sliding the tubes over the pins with minimum or no backlash.

The above and other related objects and features of the present invention will be apparent from a reading of the following description of the disclosure shown in the accompanying drawings and the novelty thereof pointed out in the appended claims.

BRIEF DESCRIPTION OF THE DRAWINGS

FIG. 1 is a part sectioned longitudinal view of half of the flexible coupling according to the present invention together with part of an engine flywheel;

FIG. 1A is an enlarged partial view of the flexible coupling of FIG. 1 showing a tapered section of rubber tubes 10;

FIG. 2 is an end view of a quarter of the coupling in the direction of arrow X of FIG. 1 (flywheel not shown);

FIG. 3 is a perspective view of a reinforcement skeleton forming part of the flexible coupling of the present invention;

FIG. 4 is a sectioned view of the reinforcement skeleton along line A—A of FIG. 2;

FIG. 5 is a part sectioned longitudinal view of a second embodiment of the present invention;

FIG. 6 is a part sectioned longitudinal view of a third embodiment of the present invention; and FIG. 7 is an end view of FIG. 6 showing a quarter of the coupling.

DETAILED DESCRIPTION OF PREFERRED EMBODIMENTS

Referring now to FIGS. 1 and 2 in which for convenience only part of the coupling is shown, the rest of the coupling being the mirror image of the part shown about the center lines, the flexible coupling generally indicated by arrow 1 is connected between a hub 2 and a flywheel 3 of an internal combustion engine (not shown). The hub 2 is machined to fit on to a shaft of a driven component (not shown) of the engine, for example, a gearbox or an alternator. The coupling 1 has a main body of rubber 4 and is connected at its outer end to the flywheel 3.

An inner member 5 of cylindrical shape and having a radially inwardly directed flange 6 is connected to the hub 2 by a plurality of equiangularly spaced screws 7 which pass through the flange. The inner member 5 is vulcanized on its outer surface 5a to the main body of rubber 4.

The main body of rubber 4 is of disc-like configuration having radial end faces 4a and 4b configured so that the axial thickness of the body 4 diminishes radially outwards. The body has embedded in it, adjacent its outer edge, a metal reinforcement skeleton 8 which is shown in detail in FIG. 3. The skeleton 8 comprises a plurality of equiangularly spaced tubes 9 which are linked together by integral arcuate bridges 9a of inverted T-shaped cross section (see FIG. 4) to form a complete ring. The bridges 9a each comprise a radially extending web 9b linking adjacent tubes 9 and an axially extending wall 9c extending between and smoothly flaring into the outer circumference of the tubes 9, as shown especially in FIG. 2.

The inside of each tube 9 is lined with a rubber tube 10 formed from rubber which is harder than the rubber in the main body 4. As particularly shown in FIG. 1A, the rubber tube 10 is internally tapered from both ends 10a to a minimum diameter at the center 10b. Within the rubber tube 10 there is shown a sleeve or pin 11 which is slightly longer than the rubber tube 10. One end of the sleeve 11 has rounded edges 12 and the other end has a boss 13. The minimum inside diameter of the rubber tube 10 is slightly less than the outside diameter of the sleeve 11.

A location ring 14 fits into a recess 15 provided in the flywheel 3 and against a shoulder 15a. The location ring 14 is drilled and counterbored at 14a to match the hole pattern in the flywheel 3. The boss 13 on each sleeve 11 locates in the corresponding counterbore 14a in the location ring.

The coupling 1 is fixed to the flywheel 3 by means of screws 16 which pass through the sleeves 11 and the drillings and counterbores 14a in the location ring 14 to engage in a threaded bore 3a in the flywheel 3. The sleeves 11 may, in an alternative embodiment, be counterbored to receive the head 16a of each screw 16.

The coupling is assembled in the following manner. The location ring 14 and sleeves 11 are attached to the flywheel 3 by means of the screws 16 and the hub 2 is connected to a driven shaft by means of, for example, a key. The coupling 1 comprising the rubber body 4, the inner member 5, the skeleton 8 and the rubber tubes 10 is then connected to the hub 2 by means of screws 7. The rubber tubes 10 are lubricated with, for example, silicon fluid. The coupling 1 and the flywheel 3 can then be assembled blind by bringing them together and aligning the sleeves 11 to their respective tapered holes formed by the rubber tubes 10 in the coupling 1 by feel. The engine and driven machine are then pushed together such that the sleeves 11 enter the rubber tubes 10. The rounded edges 12 of the sleeves 11 and the tapered bores of the rubber tubes 10 facilitate entry of the sleeves 11 into the tubes 10.

In manufacture, the inner member 5 and skeleton 8 are placed within a mold and the rubber 4 is injected into the mold and vulcanized to them to form the main body and the tubes. The rubber body 4 and the rubber tubes 10 are of different rubber compound but are injected simultaneously into the rubber mold. The rubber tubes 10 have a high value of hardness designed to resist deformation and abrasion from the loads imposed by the sleeves 11 whereas the rubber body 4 has a low value of hardness and thus produces a low torsional stiffness in the coupling 1.

The rubber body 4 is tapered as described to provide for uniform torsional strength throughout the coupling.

By virtue of the minimum internal diameter of the rubber tube 10 being less than the outer diameter of the sleeve 11 a precompression is induced in the rubber tube 10.

The arrangement of the sleeves 11 in the tubes 10 provides for a very low axial stiffness for the coupling 1. As the friction force between the sleeves 11 and the rubber tubes 10 is not great the coupling is allowed to slide axially on the sleeves 11 while in use. This axial movement is desirable in couplings to provide compensation for any misalignment of the coupled components. The relatively high radial stiffness of the connection ensures that the torque load or centrifugal stresses do not tend to cause swelling of the rubber tubes 10 and thus they have little or no effect on the axial stiffness.

The skeleton 8 is bonded to the rubber body 4 over a large surface area such that the stress of the rubber to metal bond has a relatively low value. The skeleton 8 acts to reinforce the harder rubber of the tubes and provides a strong connection resistant to localized deformation of the rubber.

The skeleton 8 and the rubber tubes 10 preloaded by the sleeves 11 act to eliminate virtually all backlash. The provision of a rubber body 4 which entirely encompasses the skeleton 8 and therefore the connection holes gives extra flexibility in the coupling compared with known couplings of this kind. This allows the rubber 4 to have a lower stiffness without overstressing the rubber 4.

The bridges 9a of the skeleton 8 provide restraint from centrifugal forces acting on the connection tubes 9 and the associated fixings as the coupling rotates, and help to reduce the stress concentration in its rubber body 4 near each tube 10.

In summary, it can be seen that in the embodiment described the coupling 1 provides extra torsional flexibility while minimizing backlash and allowing blind assembly.

It will be appreciated that the coupling of the present invention can also be used in applications where blind fitting is not required. In such cases the coupling can be bolted to the flywheel once the tubes of the reinforcement skeleton have been aligned to the holes in the flywheel. The backlash in these cases will be zero. Furthermore, there may be applications where the elimination of backlash is not a significant concern in relation to the torsional flexibility requirement, so couplings may be provided which do not have the rubber tubes 10 lining the tubes 9 of the reinforcement skeleton 8.

FIG. 5 shows an alternative embodiment of the present invention in which an alternative connection arrangement between the flexible coupling 1 of FIGS. 1 to 3 and the flywheel is provided to suit other designs of flywheels or driving machines. The same reference numerals but incremented by a value of 100 are used to identify parts common to both embodiments. In this design the location ring 114 is extended radially outwardly. The ring 114 has a plurality of equiangularly spaced outer holes 117a and similarly spaced inner holes 117b counterbored at 117c. The boss 113 of each sleeve 111 locates in the counterbored hole 117c as before and the coupling, indicated generally by arrow 101, is connected to the location ring 114 by a nut and bolt arrangement 118 and 118a respectively. The coupling 101 is connected to the flywheel 103 by a plurality of equiangularly spaced screws 119 which pass through the outer hole 117a in the location ring 114.

FIGS. 6 and 7 show a further alternative embodiment in which parts common to the first embodiment are given the same reference numeral but incremented by a value of 200. For convenience, only part of the coupling is shown, the rest of the coupling being the mirror image of the part shown about the center lines. In this embodiment of the invention the location ring 214 extends radially inwardly from the flywheel 203 connection. An inner limit ring 220 is connected in the same plane as the location ring 214 to the hub 202 and inner member 205 by means of screws 207. The location ring 214 has radially inwardly extending projections which project into the spaces between corresponding outwardly extending projections 222 on the inner limit ring 220. This arrangement acts as a failsafe mechanism. If the rubber of the main body 204 should fail during rotation the degree of relative rotational motion between the hub 202 and the flywheel 203 is limited by the abutment of the projections 221, 222 on the limit ring 220 and location ring 214, respectively. Thus, despite the rubber failure the projections enable the drive to be transmitted by the coupling until the requisite repair action can be taken.

While preferred embodiments of the present invention have been described, it should be apparent to those skilled in the art that it may be practiced in other forms without departing from the spirit and the scope thereof.

Having thus described the invention, what is claimed as novel and desired to be secured by letters patent of the United States is:

1. A flexible coupling for interconnecting first and second machine components, comprising:

a rigid inner annular member connectable to one of the machine components, an outer annular member connectable to the second of the machine components, a resilient annular body fixed to said inner and outer annular members, said outer annular member comprising a plurality of arcuately spaced rigid tubes having inner walls and extending generally axially through and embedded in said resilient annular body, a plurality of rigid pins connected to the second of the machine elements and extending through said tubes, and a resilient annular lining fixed to the inner walls of each of said tubes such that no more than a zero clearance exists between the pins and said resilient annular lining of said tubes, said resilient annular linings initially having a tapered bore with the minimum diameter spaced from the ends of said tubes to facilitate sliding of the pins into the tubes so to compress the annular linings, whereby the coupling can be assembled by sliding the resilient annular lining of the tubes over the pins with minimum or no backlash.

2. A flexible coupling as in claim 1 wherein the resilient annular linings fixed to the inner walls of said tubes are harder than the resilient annular body.

3. A flexible coupling as in claim 1 wherein the tapered bore of said annular resilient linings is tapered from the ends of said tubes such that the minimum diameter of the annular resilient linings is at about the midpoint of said tubes.

4. A flexible coupling as in claim 1 wherein said outer annular member further comprises an annular plate to which the rigid pins are secured, said plate being secured to the other of said machine components.

5. A flexible coupling as in claim 4 wherein said rigid pins are secured to said other of said machine component through said annular plate.

6. A flexible coupling as in claim 5 further comprising:

an inner annular plate secured to said annular plate, said inner annular plate being coplaner with and radially inward from said annular plate, said inner annular plate and said annular plate having interfitting radial projections for permitting only limited relative rotation therebetween.

7. A flexible coupling as in claim 4 wherein said annular plate extends radially outward from said outer annular member means, the radially outer portion of said annular plate being secured to the other of said machine components.

8. A flexible coupling as in claim 1 wherein said outer annular member further comprises arcuate integral connecting pieces extending between and interconnecting said tubes.

9. A flexible coupling as in claim 8 wherein said arcuate connecting pieces are dimensioned so that they are completely imbedded in said resilient annular body whereby torsional stresses are more uniformly transferred from said outer annular member means to said resilient annular body.

10. A flexible coupling as in claim 9 wherein said arcuate connecting pieces are T-shaped in cross section having a web extending radially outward to a point in line with the radially outermost points of said tubes.

* * * * *